United States Patent Office.

WILLIAM P. TAGGART, OF POTTSTOWN, ASSIGNOR OF TWO-THIRDS TO AARON H. HARLEY AND FRANCIS R. LAWSON, OF PHILADELPHIA, PENNSYLVANIA.

DISINFECTANT.

SPECIFICATION forming part of Letters Patent No. 423,883, dated March 18, 1890.

Application filed October 29, 1889. Serial No. 328,570. (No specimens.)

*To all whom it may concern:*

Be it known that I, WILLIAM P. TAGGART, a citizen of the United States, residing at Pottstown, in the county of Montgomery and State of Pennsylvania, have invented a new and useful Composition of Matter to be Used as a Disinfectant, of which the following is a specification.

My invention has relation to a composition of matter for use as a disinfectant or deodorizer in infected districts or places of abode of the germs of disease arising from the decaying, decomposition, or other pestilential condition of organic matter and from other causes, and has for its object the provision of a novel composition which will immediately, thoroughly, and effectively destroy and prevent the dissemination of germs of disease arising from the above-mentioned cause and render perfectly healthy the air of any place or places in which it may be found desirable or necessary to use the same without there being any resultant staining of parts with which it comes into contact, and, if such parts be of metal, the corrosion thereof, obviating all danger of explosion of the composition due to the generation of gases therein, and its evaporation and consequent loss of strength and effectiveness.

My composition consists of the following ingredients, combined in the proportions stated, viz: chloride of lime, four ounces; rain-water, two quarts; permanganate of potash, two ounces; salt, one-half pound; saltpeter, one-fourth pound; rain-water, two quarts.

The first two elements of the above formula being first thoroughly mingled in any convenient manner, then the four remaining elements are mingled with the solution formed by the first two, there being altogether four quarts of water employed divided into two parts, as will be readily understood. It is also quite obvious that the quantities of each element above enumerated can be increased or diminished at pleasure; but the relative proportions must be preserved, so as to be the same as given in the formula, which proportions are such as to effect the best result. After the whole is complete after the manner above described the same is to be diluted in the ordinary river or other convenient water in such quantity or quantities as the necessities of the case warrant or the judgment of the mixer may dictate.

The disinfecting properties of chloride of lime are well known, and I am aware that the same has heretofore been combined with permanganate of potash; but such a mixture, owing to the nature of each, will result in the generation of gases, which, when confined in an air-tight vessel, will explode; besides the permanganate of potash will stain whatever it is brought into contact with. Consequently the usefulness of such a compound is seriously impaired; but the addition of salt to the composition, which is of a cooling nature, counteracts on the heating tendency of the chloride of lime and overcomes all danger of the generation of explosive gases due to such heat; besides the addition of salt reduces the tendency toward staining, which, in conjunction with saltpeter, wholly destroys the staining properties above mentioned. Furthermore, the saltpeter prevents the evaporation and consequent loss of strength of the composition.

In addition to the disinfecting properties of my composition, there are various other beneficial results attainable through its employment—for instance, for removing filthy incrustation from the inside of iron pipes without corroding them, also the purification of water, the deodorizing of impure air, &c.

Having fully described my invention, what I claim, and desire to secure by Letters Patent of the United States, is—

The herein-described composition of matter to be used for disinfecting and other purposes, consisting of chloride of lime, water, permanganate of potash, salt, and saltpeter, in the proportions specified.

In testimony that I claim the foregoing I have hereunto set my hand this 22d day of October, A. D. 1889.

WILLIAM P. TAGGART.

Witnesses:
WM. H. POWELL,
R. DALE SPARHAWK.